UNITED STATES PATENT OFFICE.

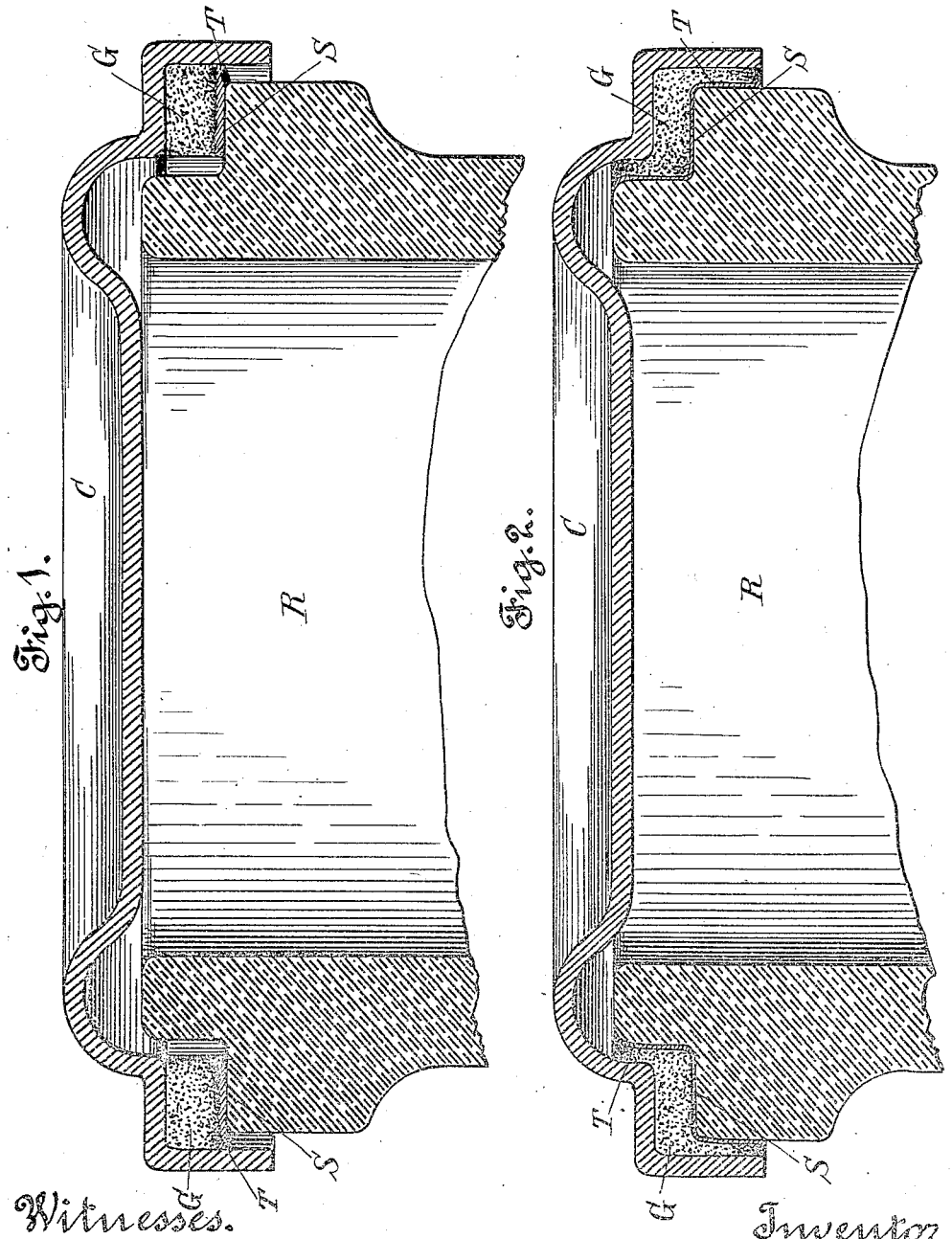

JULIUS A. LANDSBERGER, OF ALAMEDA, CALIFORNIA, ASSIGNOR TO HERMETIC CLOSURE CO., OF CHICAGO, ILLINOIS.

PACKING-GASKET.

No. 816,803.  Specification of Letters Patent.  Patented April 3, 1906.

Application filed March 20, 1905. Serial No. 251,182.

*To all whom it may concern:*

Be it known that I, JULIUS A. LANDSBERGER, a citizen of the United States, residing at Alameda, in the county of Alameda and State of California, have invented a new and useful Improvement in Packing-Gaskets, of which the following is a specification.

My invention relates to improvements in packing-gaskets, and while valuable in all cases where an air-tight joint is required is especially applicable for making a hermetic seal in closures for receptacles, preferably of the class in which a solid composition gasket is permanently inserted in the cover. This particular application will therefore be described as embodying the essential features of my invention.

The object of my invention is to facilitate and simplify the operation of making an air-tight joint between the members to be connected. I attain this object by treating the packing-gasket in the manner hereinafter described, as well as illustrated by the accompanying drawings, in which—

Figure 1 is an enlarged view of a sectional elevation of the upper part of a receptacle and its cover with the gasket inserted, showing the condition of the latter before the application of pressure upon the cover. Fig. 2 is a similar view showing the condition of the gasket after the application of pressure on the cover.

Similar letters represent corresponding parts in both views.

In the figures, R is the receptacle, C the cover, G the gasket inserted in the cover, S the sealing-seat of the receptacle, and T a compound with which the gasket-face is coated, as hereinafter fully described.

My invention, while useful in all cases where receptacles of the class mentioned are to be hermetically sealed, is especially valuable in connection with the cold sealing of dry products in a vacuum. Heretofore in such cold sealing it was customary just before sealing jars to moisten the gaskets, preferably with diluted glycerin, in order to insure making a tight seal. This moistening was necessary for the following reason: The gaskets, which are generally made of india-rubber or rubber compositions, always possess minute surface irregularities or crevices. In Fig. 1 these crevices are represented on the exposed under face of the gasket G in exaggerated form. These tiny passages, while almost microscopic in size, are still large enough to permit the air to slowly percolate through unless the cover is applied to the receptacle with sufficient pressure to instantly flatten out the ridges forming said crevices, so as to force every particle of the gasket-face into tight contact with the sealing-seat S of the receptacle. With the vacuum - closures ordinarily used this is not possible, as the atmospheric pressure is the sole holding means. This tendency of the joint to leak is augmented by the presence on the surface of all commercial rubbers of a fine film composed of chalk or similar ingredients used in the manufacture of the compound, as well as of dust from the atmosphere. When applied in the usual way, the cover slowly settles down upon the constant pressure of the atmosphere, gradually flattening out the said ridges, and finally forcing every particle of the gasket-face into tight contact with the smooth sealing-surface of the receptacle, so that ultimately a hermetic seal is effected. With soft-rubber rings, such as were used formerly with the old-style vacuum-closures, this "flattening out" was generally accomplished before sufficient air could force its way into the receptacle to entirely neutralize the vacuum created therein; but with the solid composition gaskets, such as are now used with improved vacuum-closures of the class mentioned, the settling of the cover is necessarily slow, and unless some precaution is taken to prevent the ingress of the atmosphere to the interior of the receptacle until the gasket has been sufficiently flattened out to form an air-tight joint the vacuum therein will often be totally destroyed. To prevent this leakage, it is necessary to choke up the little passages referred to long enough to allow the gasket to become pressed against the receptacle tightly enough to operate as above described, and this may be accomplished by moistening the gasket just before using with any slow-evaporating liquid, which filling up the said passages excludes the air, thus making what may properly be termed the "auxiliary seal." With the old - fashioned separate rubber rings, which were formerly used altogether, this moistening was a simple operation, as it was only necessary to immerse the rings in any suitable liquid just before applying them to the receptacles. With the improved vacuum-closures, however, such as shown in the drawings, in which the gasket G is made of a substantially solid inelastic composition permanently inserted in the cover C, the moistening of the gasket becomes more difficult, as it is necessary to thoroughly coat the exposed under surface of the gasket without smearing the liquid on the inner surface of the cap. While it is possible to coat the gaskets in the manner required with a brush just before using them, this method is slow and tedious and adds to the operation of canning a special operation, which it is desirable to obviate. This object is attained by my invention, which, broadly speaking, consists in glazing the exposed surface of the gasket G, preferably on the under side, as shown in Fig. 1, with a thin coating of any suitable compound or substance T not detrimental to the composition or material from which the gasket is made and which, filling up the crevices referred to, will give to the gasket the smooth polished surface necessary to make the auxiliary seal by effectually excluding the air when brought into tight contact with the smooth sealing-seat S of the receptacle R. Thus the covers with the inserted gaskets properly coated may be furnished to the packers all ready to use, so that no special moistening is required before sealing. The desired results may be partially attained by coating the gaskets with a semimoist substance, such as vaseline, which is non-evaporating. This method is not advisable, however, for the reason that the surface of the gasket being continually moist would tend to collect dust and dirt, thus largely neutralizing the effect of the coating. I prefer to use a compound or material which is substantially solid at the normal atmospheric temperature, having, preferably, a low melting-point and which when solid has a smooth yielding surface. A low melting-point is valuable, because the improved vacuum-closures referred to are generally exhausted and sealed in a vacuum-machine having a heated presser-head for softening the inserted composition-gaskets in the covers. The gaskets, I should explain, are made of a composition which will soften with heating and harden again with cooling. The coating compound T having a low melting-point will instantly liquefy when subjected to this heat and spread over practically the entire exposed surface of the inserted gaskets G, as clearly shown in Fig. 2, thus covering any portion not originally coated and having substantially the same effect as if the gasket were thoroughly moistened with a liquid just before using. So as not to be dependent, however, upon the application of heat in the sealing operation, it is desirable that the coating compound should present a smooth surface and be sufficiently yielding to almost instantly adapt itself to the ordinary irregularities of the sealing-surface S of the receptacle. Such a compound as described may be easily made from a substance such as vaseline mixed with paraffin-wax or similar stiffening material, which combine readily. By varying the proportion of the two parts any desired melting-point or degree of solidity may be obtained. Either straight vaseline or straight paraffin-wax used separately would give partially equivalent results. The former is undesirable, however, for the reason mentioned above and the latter as being too stiff to quickly adapt itself to surface irregularities of the sealing-seat of the receptacle and as having too high a melting-point. To coat the gaskets, the compound should be first heated and reduced to a liquid. It may then be applied to the exposed under surface of the gasket G with a brush or may be applied by means of a special apparatus. The coating compound hardens quickly with cooling, so that the caps, with the gaskets inserted therein, may be handled, stored, shipped, and used in a commercial way without any detrimental effects to the coating. This manner of treating the gaskets for the described purpose should not be confused with the well-known method of saturating fibrous or porous materials or textile substances with paraffin-wax or like substances to render same air-excluding mediums. In the latter case the wax or equivalent substance is depended on permanently to exclude the air, whereas by my method the gasket is itself an air-excluding medium, and the only function of the coating is to fill up the minute surface irregularities with a smooth yielding compound or material which preferably will instantly liquefy with slight heating, so as to facilitate making what I have termed the auxiliary seal, thus obviating the necessity of moistening the gaskets just before using, or in lieu thereof the necessity of applying excessive pressure to accomplish the same purpose.

It is not intended nor required that the coating material used should permeate or in any way affect the actual substance of the gasket, but merely to treat the surface so as to accomplish no more than moistening an ordinary commercial-rubber ring with a liquid. I therefore do not claim such combination broadly; but What I do claim as my invention, and desire to secure by Letters Patent, is—

1. As a new article of manufacture, a packing-gasket having its surface coated or glazed with a compound of vaseline and paraffin-wax, substantially as described, for the purpose specified.

2. As a new article of manufacture, a cover for receptacles carrying a packing-gasket, said gasket having its exposed surface coated or glazed with a compound of vaseline and paraffin-wax, substantially as described, for the purpose specified.

3. As a new article of manufacture, a cover for receptacles carrying a packing-gasket, said gasket having its exposed under surface coated or glazed with a compound of vaseline and paraffin-wax, substantially as described, for the purpose specified.

JULIUS A. LANDSBERGER.

Witnesses:
A. W. MILLER,
WM. C. BUHLER